United States Patent [19]
Lutz

[11] Patent Number: 6,102,144
[45] Date of Patent: Aug. 15, 2000

[54] HYBRID VEHICLE DRIVE FOR A MOTOR VEHICLE

[75] Inventor: Dieter Lutz, Schweinfurt, Germany

[73] Assignee: Mannesmann Sachs AG, Schweinfurt, Germany

[21] Appl. No.: 09/082,874

[22] Filed: May 21, 1998

[30] Foreign Application Priority Data

May 21, 1997 [DE] Germany .................. 197 21 298

[51] Int. Cl.[7] .................................................. B60K 6/00
[52] U.S. Cl. ........................................ 180/65.2; 180/65.3
[58] Field of Search ................ 180/65.1, 65.2, 180/65.3, 65.4

[56] References Cited

U.S. PATENT DOCUMENTS

| | | | |
|---|---|---|---|
| 5,337,866 | 8/1994 | Sturmer et al. | 477/175 |
| 5,438,882 | 8/1995 | Karim-Panahi et al. | 73/862.324 |
| 5,755,302 | 5/1998 | Lutz et al. | 180/65.2 |
| 5,881,559 | 3/1999 | Kawamura | 60/59.7 |
| 5,909,720 | 6/1999 | Yamaoka et al. | 123/179.3 |
| 5,934,424 | 8/1999 | Hosek et al. | 188/379 |
| 5,984,034 | 11/1999 | Morisawa et al. | 180/65.2 |

FOREIGN PATENT DOCUMENTS

| | | |
|---|---|---|
| 32 30 607 C2 | 2/1984 | Germany . |
| 40 15 701 A1 | 11/1990 | Germany . |
| 43 23 601 A1 | 1/1995 | Germany . |
| 4-311631 | 11/1992 | Japan . |
| 8-210373 | 8/1996 | Japan . |
| 8-303270 | 11/1996 | Japan . |

*Primary Examiner*—Brian L. Johnson
*Assistant Examiner*—Bridget Avery
*Attorney, Agent, or Firm*—Cohen, Pontani, Lieberman & Pavane

[57] ABSTRACT

A hybrid vehicle drive for a motor vehicle includes an internal combustion engine and an electric machine which is selectively coupled with the internal combustion engine. The electric machine can be operated as a generator and as a motor. Regulation device which responds to a reference signal predetermined by a reference signal preset device are provided for the active damping of vibrations, especially torsional vibrations in the torque transmission path between the internal combustion engine and wheels of the motor vehicle driven by the latter. The regulation device also respond to sensing device which deliver an actual-value vibration signal containing vibration information about a rotating structural component of the motor vehicle and control the load torque exerted on the internal combustion engine by the electric machine for reducing or eliminating the vibrations of the structural component. An analysis device for determining a frequency spectrum of the actual-value vibration signal is associated with the regulation device. The reference signal preset device establishes a reference signal with predetermined frequency spectrum. The regulation device control the frequency spectrum of the load torque exerted on the internal combustion engine by the electric machine such that excessive spectral vibrations of the actual-value vibration signal are reduced or eliminated.

13 Claims, 2 Drawing Sheets

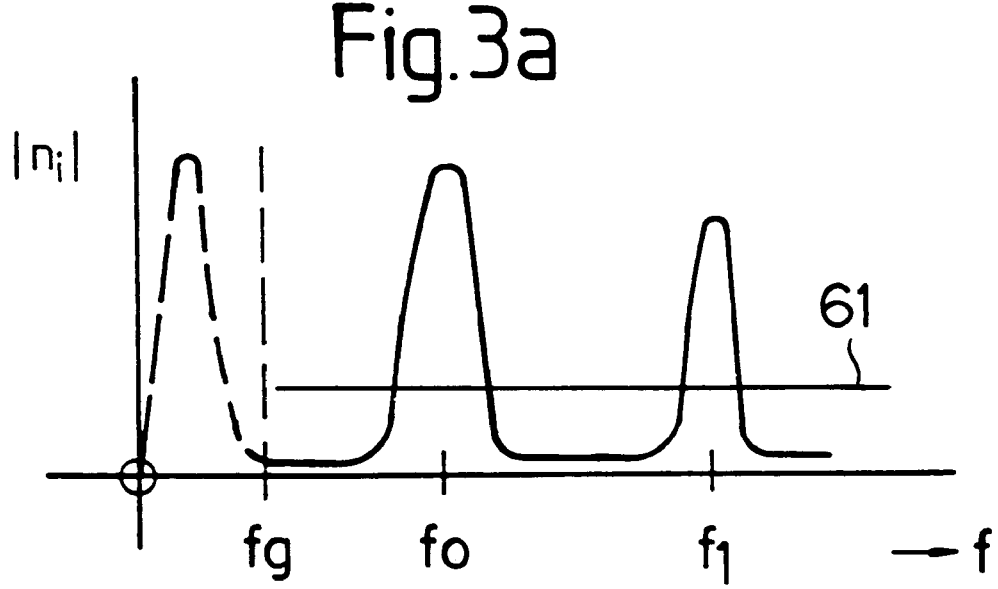
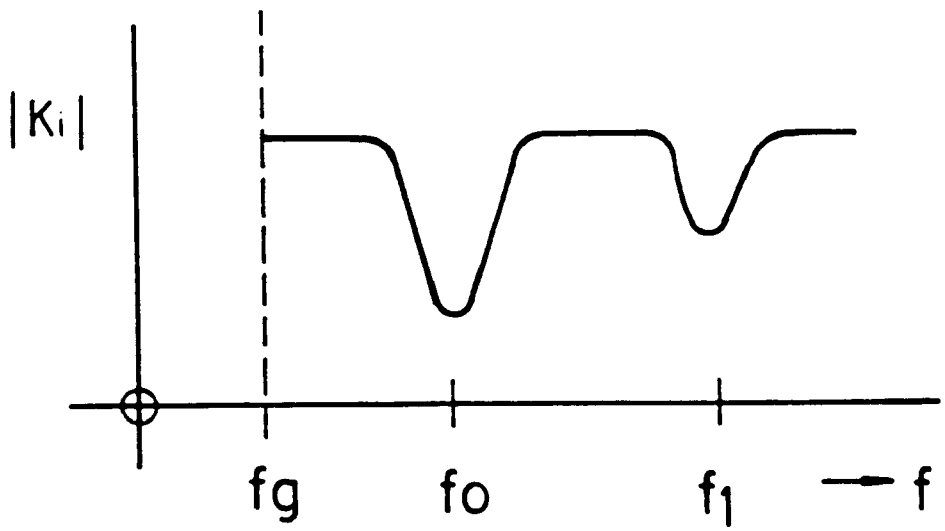

HYBRID VEHICLE DRIVE FOR A MOTOR VEHICLE

BACKGROUND OF THE INVENTION

1. Field of the Invention

The invention is directed to a hybrid vehicle drive for a motor vehicle.

2. Description of the Related Art

The irregularity or unevenness of the rotation of the crankshaft in conventional reciprocating-piston internal combustion engines excites torsional vibrations in the drivetrain conducting the torque from the internal combustion engine to the driving wheels of a motor vehicle. These torsional vibrations manifest themselves as undesirable shaking movements or at least as noise. Torsional vibrations of this kind are customarily damped by torsional vibration dampers that are integrated in the clutch disk of a clutch in the drivetrain. Since the torsional vibrations occur in the drivetrain in a resonant manner within a relatively large range of operating rates of rotation, conventional torsional vibration dampers of this type usually have a plurality of spring stages and friction devices dimensioned for various torque ranges. The torsional vibration dampers are therefore comparatively elaborate and are also frequently susceptible to malfunctions.

Starter-generators are electrical machines that can be operated as an electric motor or as a generator. German reference DE 32 30 607 C2 discloses a prior art starter-generator that is coupled with the crankshaft of a combustion engine and is utilized for active vibration damping. The prior art starter-generator operates as a generator when the motor vehicle is driven by an internal combustion engine. In this configuration, the starter-generator applies a load torque to the internal combustion engine while it charges a battery in the motor vehicle. The amount of load torque depends on its exciting current. A regulating circuit which responds to the torsional vibrations superposed on the rotation of the crankshaft and controls the exciting current of the electric machine such that the vibrations are regulated to a predetermined reference value. The reference variable or command variable of this regulating circuit representing the actual value is obtained by a differential element from the rate of rotation of the engine detected by a tachometer or speed sensor.

German references DE 40 15 701 and DE 43 23 601 disclose parallel hybrid drives for a motor vehicle in which the electric machine intended for the vehicle drive of the motor vehicle is utilized in addition to the internal combustion engine for active vibration damping. In this case also, the load torque exerted on the internal combustion engine by the electric machine is utilized for purposes of active vibration damping of torsional vibrations. However, it has been shown that the damping behavior of conventional active vibration dampers has often not achieved the standard previously achieved with mechanical vibration dampers.

SUMMARY OF THE INVENTION

It is the object of the invention to provide a hybrid vehicle drive for a motor vehicle which provides a sufficiently comfortable active damping of vibrations, especially torsional vibrations of the drivetrain, essentially by utilizing structural components of conventional hybrid vehicle drives.

The present invention is a hybrid drive for a motor vehicle which includes an internal combustion engine for driving at least one wheel of the motor vehicle and an electric machine which is selectively coupled with the internal combustion engine and which is operable as either a generator or a motor. A sensor delivers an actual-value vibration signal containing vibration information about a structural component of the motor vehicle, preferably about a rotating structural component arranged in the torque transmission path between the combustion engine and the wheel. A regulator receives a reference signal given by a reference signal preset device and controls the load torque exerted on the internal combustion engine by the electric machine for purposes of reducing or eliminating the vibrations of the structural component in response to the vibration information in the actual-value vibration signal.

The regulator includes a device for determining a frequency spectrum of the actual-value vibration signal. The reference signal preset device establishes a reference signal with a predetermined frequency spectrum and the regulator controls the frequency spectrum of the load torque exerted on the internal combustion engine by the electric machine such that excessive vibrations of the actual-value vibration signal which exceed to predetermined frequency spectrum are reduced or eliminated.

The invention is based on the idea that the unevenness of the crankshaft rotation of the internal combustion engine generally excites vibrations in the drivetrain or in the body of the motor vehicle which comprise an entire spectrum of vibrations of different frequencies. The regulator includes a spectral analysis device that determines the different frequency components by amplitude and phase (i.e., by real and imaginary parts) of the measured actual-value signal. The reference signal preset device, for its own part, fixes the reference signal at a predetermined frequency spectrum and thus enables the regulator to damp the spectral components of the actual-value signal specifically. The load torque exerted by the electric machine on the internal combustion engine is thus controlled such that excessive spectral vibrations of the actual-value vibration signal are reduced or eliminated. In this way, a very fast-response, exact vibration damping is achieved.

The sensing means may comprise speed sensors or angular velocity sensors which detect the instantaneous rate of rotation or angular velocity with a precision such that even torsional vibrations superposed on the mean rate of rotation are detected with sufficient accuracy. Also suitable, however, are sensors which do not directly detect the rate of rotation or the angular velocity of rotating structural components, but which, rather, permit only an indirect measurement of perturbations such, for example, as torque sensors, vibration sensors, or noise sensors.

The frequency spectrum of the actual-value signal may also contain spectral components resulting from a change in the operating speed of the drivetrain during acceleration of the motor vehicle. It has been shown, however, that the frequencies of such spectral components, due to the limited capacity of the internal combustion engine, are comparatively low in the frequency spectrum, while the spectral components of the torsional vibrations to be damped are usually found at comparatively high frequencies. Therefore, in a preferred embodiment of the invention, the regulator includes a frequency limiting means which limits the frequency spectrum of the actual-value vibration signal utilized for controlling the load torque to frequencies above a predetermined frequency threshold. In other words, the frequency limiting means have a high-pass character for the frequency components utilized for controlling the load torque. In this preferred embodiment, the regulator can actively damp vibrations but does not negatively influence the dynamic behavior of the hybrid drive. The electric motor may be utilized in this way for active damping of torsional vibrations even when it operates as a motor while assisting the internal combustion engine during acceleration of the motor vehicle. In this particular embodiment, the predetermined frequency threshold is dimensioned above the spectral frequency representing a change in the rate of rotation of the rotating structural component at maximum drive acceleration of the motor vehicle in the frequency spectrum of the actual-value vibration signal.

The reference signal preset device comprises a storage device or memory in which reference values of at least one reference signal characteristic line are stored as a function of a frequency parameter. Such characteristic lines may be determined for the motor vehicle empirically; but the characteristic lines may also be adaptively corrected in a learning process in a known manner during operation of the motor vehicle. The reference signal characteristic lines preferably indicate only spectral maximum values of the reference values which may not be exceeded in the active damping operation. This enables a characteristic-field type regulation such as is known for controlling internal combustion engines. The regulator checks that the frequency spectrum of the actual signals on the whole does not exceed the spectral maximum values of the reference signal and, in the event that spectral components are exceeded, increases damping in these frequency ranges.

The characteristic line storage device stores a plurality of characteristic lines as a function of additional operating parameters of the motor vehicle. The plural characteristic lines allow for the fact that the vibration behavior in different operating situations may require different damping measures. The characteristic line storage device preferably contains characteristic lines as a function of at least one of the following operating parameters:

a) torque of the internal combustion engine,
b) rate of rotation of the internal combustion engine,
c) driving speed of the motor vehicle,
d) temperature of the internal combustion engine,
e) instantaneous transmission ratio of a variable transmission arranged in the torque transmission path,
f) weight of the motor vehicle, and
g) whether the internal combustion engine is supplying torque to or receiving torque from the drive shaft.

For this purpose, sensors responding to changes in these operating parameters are associated with the regulator and enable the latter to select the characteristic line depending on the magnitude of these operating parameters.

The electric machine must be dimensioned in such a way with respect to its torque behavior that it is capable of both increasing and diminishing the torque generated by the internal combustion engine during driving operation at constant vehicle speed, as well as during acceleration, for active vibration damping. For motor operation, the electric machine will generally have torque data and output data corresponding to the torque and output of the internal combustion engine. On the other hand, if the electric machine should respond to driver currents or exciting currents of a comparatively large frequency spectrum, it must have a comparatively large quantity of poles and corresponding pole windings to operate it with driver currents or exciting currents of sufficiently different frequencies. Therefore, a preferred embodiment of the electric machine comprises a large number of poles and the regulator controls a current adjusting device for pole windings of the electric machine.

A plurality of different structural components may exhibit vibrations depending on the operating situation. Therefore, the sensor preferably comprises a plurality of sensors which respond to different vibration parameters and/or vibrations of different structural components. The regulator may be constructed such that it simultaneously evaluates signals of the plurality of sensors. The regulator may also evaluate selected ones of the plurality of sensors depending on the operating configuration of the motor vehicle for generating the actual value signals, because, for example, the structural components that vibrate during idling operation are different than those that vibrate during full-load operation while driving.

It is preferably provided that in rotational angle phases in which the electric machine decreases or takes off energy supplied by the internal combustion engine during active torsional vibration damping, this energy is supplied back into an electric drive energy storage device. This electric drive energy storage device may be, for example, a conventional vehicle battery which stores electric energy based on a chemical process. However, the energy storage process of conventional vehicle batteries is slow and is not capable of receiving energy components of high spectral frequencies. Therefore, recovery of electric energy in the above scenario is inefficient. For this reason, the electric machine is connected to a conventional battery and also to an additional electric drive energy storage device for receiving the higher-frequency electric current delivered to the electric machine during operation of the regulator during vibration damping and/or the higher-frequency electric current to be supplied back by the electric machine. Accordingly, the battery (accumulator) which customarily stores electric energy by means of chemical processes is provided as the battery delivering the vehicle drive current, and the additional electric drive energy storage device enabling storage of high-frequency current is, for example, a capacitor storage which then delivers the operating energy required for active vibration damping.

As was mentioned above, the regulator by which active vibration damping is achieved is advisably only effective with spectral components having a frequency above the predetermined frequency threshold. Below this frequency threshold, the electric machine is regulated with respect to torque by a vehicle control or the like in the customary manner for parallel hybrid drives and is not utilized for active vibration damping. However, to also dampen the vibrations whose frequencies lie below the predetermined frequency threshold, a controllable clutch is provided in the torque transmission path in a preferred embodiment, wherein the controllable clutch is adjustable, depending on the spectral components of the actual-value vibration signal at frequencies below the predetermined frequency limit, for slip which reduces or eliminates the spectral components of the vibrations. The controllable clutch is, for example, a friction clutch which can be adjusted by an actuating drive and which can be arranged, for example, in the drivetrain between the internal combustion engine and the electric machine.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIGS. 3a and 3b show frequency spectra illustrating the operation of the active damping system.

DETAILED DESCRIPTION OF THE PRESENTLY PREFERRED EMBODIMENTS

Figure 1:
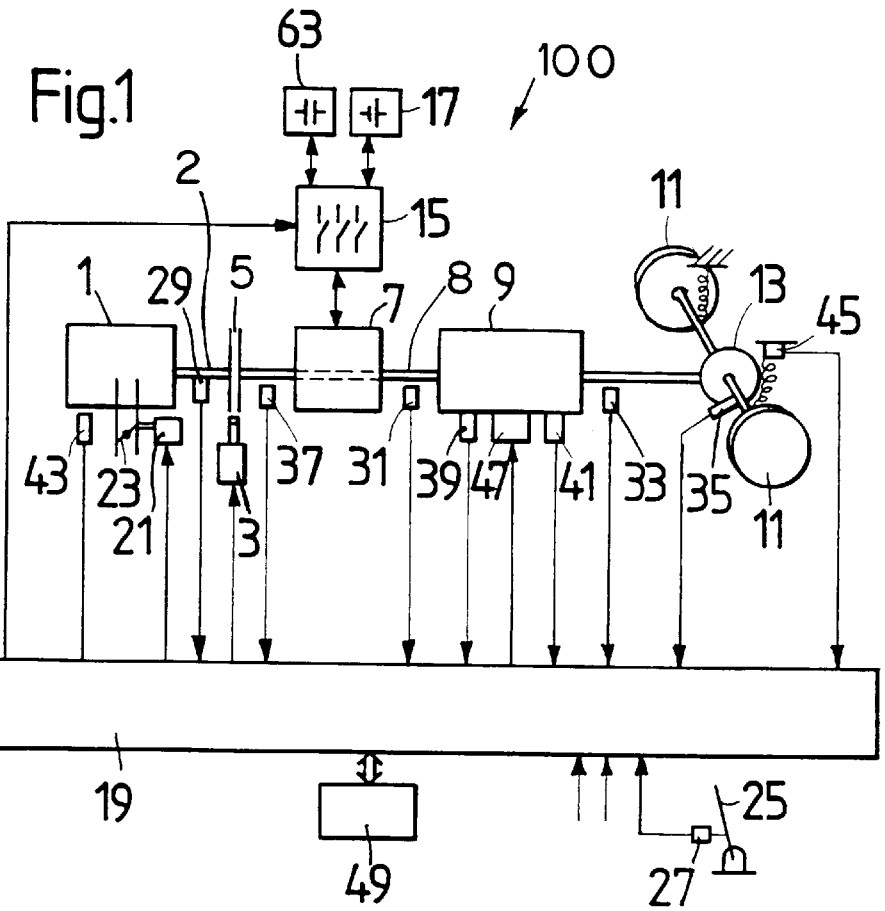
FIG. 1 is a diagrammatic view of an embodiment of a hybrid vehicle drive for a motor vehicle according to the invention.

Referring initially to FIG. 1, a parallel hybrid vehicle drive 100 for a motor vehicle (not shown) includes an internal combustion engine 1 which is coupled to an electric machine 7 by a friction clutch 5 which can be actuated by an electric actuating drive 3. The clutch 5 is coupled to the internal combustion engine 1 by a crankshaft 2. The electric machine 7 operates as a generator and as an electric motor. The electric machine 7 is drivably connected to a transmission 9 for transmitting a driving torque to driving wheels 11 via a differential gear 13. The transmission 9 may be an automatic transmission or an automated variable-speed transmission, but can also be a manual variable-speed transmission. When the clutch 5 is engaged, the internal combustion engine 1 is in a torque-transmitting driving connection with the wheels 11 via the clutch 5, the transmission 9, and the differential gear 13. A drive shaft 8 connects the clutch 5 to the transmission 9. The electric machine 7 is coupled on the drive shaft 8 of the transmission 9 so that it is fixed with respect to rotation about the drive shaft 8. When the clutch 5 is engaged, the electric machine is also connected with the crankshaft 2 of the internal combustion engine 1 so as be fixed with respect to rotation relative to it.

A vehicle battery 17 supplies current to the electric machine 7 via a current adjusting device 15. The electric machine 17 receives power from the vehicle battery 17 when operating as a motor and returns the current generated to the vehicle battery when operating as a generator. The vehicle battery 17 may be a battery storing electric energy by chemical processes or it may be an accumulator. The current adjusting device 15 provides for commutation and, if required, rectification and for the suitable phase offset of the polyphase driver currents for the electric machine 7. The speed of the electric machine 7 is varied by varying the frequency of the driver currents. The commutation rate and the torque generated by the electric machine 7 in motor operation, as well as the charging capacity of the electric machine during generator operation is controlled by a controller 19. An output adjusting element 23 of the internal combustion engine 1, for example, a throttle valve or an injection device, is also controlled by the controller 19 by an actuating drive 21. The controller 19 responds to an accelerator pedal 25 actuated by the operator of the motor vehicle, wherein the controller 19 detects the deflection of the accelerator pedal 25 with a position sensor 27.

A plurality of sensors responding to the operating parameters of the motor vehicle are also associated with the controller 19. These sensors include a plurality of speed sensors such, for example, as a speed sensor 29 which detects the rate of rotation of the internal combustion engine 1, a speed sensor 31 which detects the input rate of rotation of the transmission 9 and therefore the rate of rotation of the electric machine 7, a speed sensor 33 detecting the output rate of rotation of the transmission 9, and, in addition to or as an alternative to speed sensor 33, a speed sensor 35 detecting the rate of rotation of the wheel 11. The speed sensors 33, 35 deliver signals representing the driving speed of the motor vehicle. A torque sensor 37 is provided which detects the torque of the internal combustion engine 1 that is supplied to the transmission 9. The torque sensor 37 is optimally arranged in the area of the clutch 5 because it can be realized in this area without problems due to torsionally elastic components. The transmission setting of the transmission 9, and accordingly its instantaneous transmission ratio, is detected by a sensor 39. Optionally, a noise sensor 41 is arranged at the housing of the transmission 9 for detecting vibrations of structural component parts for the vibration damping system which will be described more fully hereinafter. The operating temperature of the internal combustion engine 1 is detected by a temperature sensor 43, and the vehicle weight can be deduced by means of a force sensor 45 integrated, for example, in the axle suspension of the wheels 11. The controller 19 such, for example, as a microcontroller, controls the rate of rotation and the torque requirements of the internal combustion engine 1, the rate of rotation and torque requirements at the electric machine 7 operated in motor operation or the charging capacity of the electric machine 7 in generator operation, and it controls, as the case may be, the automatic or automated transmission 9 by means of actuating drive 47 in response to the signals of these sensors. Data and algorithms which adapt the operation of the internal combustion engine 1, electric machine 7, and transmission 9 to one another depending on the driving situation are stored in a storage device 49 (memory) operatively connected with the controller 19.

The operation of this type of parallel hybrid vehicle drive is controllable in different ways. In a preferred embodiment, the electric machine 7 is used for starting the motor vehicle from a stop with the internal combustion engine 1 disengaged from the drive shaft 8. After the start, the internal combustion engine 1 is engaged to deliver the basic output for driving operation and the electric machine 7 is used only for covering the peak output requirement. Insofar as the internal combustion engine 1 delivers more output than required for driving the motor vehicle, the electric machine 7 operates in generator operation and charges the vehicle battery 17. When the electric machine 7 is solely responsible for the drive of the motor vehicle, the clutch 5 is open or disengaged. Of course, driving control may be divided between the internal combustion engine 1 and electric machine 7 in different strategies. For example, the electric machine 7 may be used to drive the motor vehicle at low driving speeds while the internal combustion engine 1 is used exclusively to drive the motor vehicle at high vehicle speeds. High vehicle speeds are achieved with the latter embodiment.

The controller 19 comprises regulation means which, via the electric machine 7, actively reduces or eliminates the vibrations caused by the unevenness of the crankshaft rotation of the internal combustion engine 1, especially torsional vibrations in the torque transmission path between the internal combustion engine 1 and the wheels 11. The controller 19 controls the electric machine 7 when it is used as an electric motor and also when it is operating as a generator. The controller 19 varies the supply current to the electric machine 7 such that the torque applied by the electric machine 7 to the crankshaft of the internal combustion engine 1 or the torque transmission path coupled therewith counteracts the instantaneous acceleration or instantaneous deceleration of the unevenly rotating structural components in a damping manner.

Figure 2:
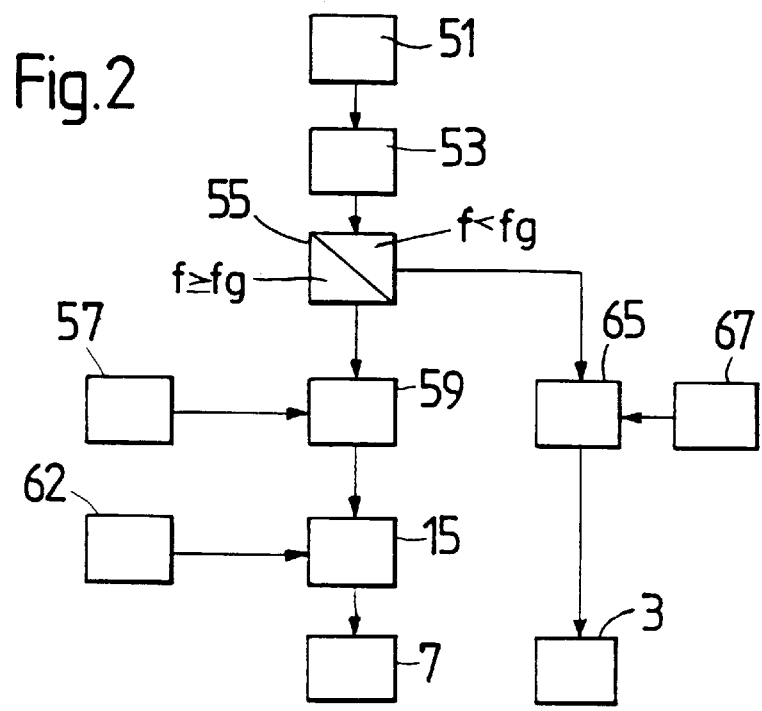
FIG. 2 is a block diagram of an embodiment of an active damping system of the hybrid vehicle drive according to the invention.

Referring now also to FIG. 2, sensing means 51 generate a signal representing an actual-value vibration signal containing vibration information about a structural component of the motor vehicle with respect to amount and phase. The sensing means 51 may comprise high-resolution speed sensors such, for example, as speed sensors 29, 31, 33, or 35 shown in FIG. 1 which deliver the instantaneous angular velocity over the whole 360-degree range of rotational angles. Sensing means 51 may also detect instantaneous vibration information with respect to magnitude and phase generated by torque sensor 37 or noise sensor 41. As will be explained in greater detail hereinafter, the sensing means 51 of the invention may also includes indirect sensors for sensing the effects of the vibrations such, for example, as the noise generation sensors or vibrations sensors for detecting the shaking movement of another structural component of the motor vehicle, instead of detecting the vibrations directly. This wide range of available types of sensors enables a selection of suitable sensors based on the different driving operations. In this way, other sources of noise, for example, unevenness introduced into the torque transmission path during driving via the wheel axles, can be purposely detected and damped.

Analyzing means 53 receives the actual-value vibration signals generated by the sensing means 51 and determines a frequency spectrum of these signals, i.e., a frequency spectrum of the vibration information according to magnitude and phase. These frequency spectral analysis means of the analyzing means 53 may comprise a plurality of filters which, while selective, are adapted to different frequencies. However, these frequency spectral analyzing means 53 preferably comprise a Fourier transform computational circuit. The computational circuit may operate digitally or in analog depending on the type of signals delivered by the sensing means, for example, on the principle of a fast Fourier transform. The analyzing means 53 deliver the magnitude and phase of the spectral components contained in the actual-value vibration signal depending on the frequency, for example, in discrete frequency steps.

Not all of the spectral components in the output signal of the analyzing means 53 are unwanted. Spectral components may also occur during intentional changes in speed in the torque transmission path such, for example, as during acceleration of the motor vehicle. A frequency crossover 55 is provided including frequency limiting means which is a high pass filter which passes all spectral components generated by the analyzing means whose spectral frequency f is greater than or equal to a limit frequency $f_g$. The limit frequency $f_g$ is selected in such a way that it lies above the frequencies of the relevant spectral components occurring at maximum acceleration of the motor vehicle. In this manner, damping of the spectral components of the acceleration of the motor vehicle is avoided. It has been shown that spectral components of this kind for hybrid-driven motor vehicles are situated at comparatively low frequencies, so that the limit frequency $f_g$ can be selected close to or usually also below the lower audibility threshold, for example, at 20 Hz. In this way, vibrations and noises occurring within the range of audibility can be damped without sacrificing the dynamics of the drive.

A regulator 59 regulates the current adjusting circuit 15 for adjusting the instantaneous load torque applied to the internal combustion engine 1 by the electric machine 7 in response to the spectrum of actual-value signals fed from the frequency crossover 55 and in response to a reference-signal spectrum delivered by a reference signal preset device 57. The regulator 59 may comprise hardware and/or software elements. The reference signal preset device 57 comprises a characteristic line storage device which may be part of the memory 49 (FIG. 1). The characteristic line storage device stores, as a function of frequency f, reference values in the form of at least one characteristic line, but especially in the form of a characteristic field which is dependent on additional parameters which will be described in greater detail hereinafter. These reference values which, for example, are determined empirically in driving tests, represent spectral maximum values for the spectral values of the actual vibration signal which are to be reduced or eliminated. The regulator 59 compares the spectral values of the actual signal with respect to magnitude and phase with the spectral maximum values determined by the reference values and supplies the current adjusting device 15 with adjusting information reducing the vibration. FIG. 3*a* shows an example of the magnitude of a spectrum of actual values for rate of rotation $n_i$ which, above the limit frequency $f_g$, has spectral components at frequencies $f_0$ and $f_1$. A sample characteristic line 61 is also shown. The characteristic line 61 determines the spectral distribution by which the electric machine is to be excited by the current adjusting device 15 depending on the frequency. FIG. 3*b* shows the spectral distribution for the magnitude of the reference value $K_f$ by which the electric machine is to be excited to reduce the actual vibrations at frequencies $f_0$ and $f_1$. A magnitude correction of the driver currents and exciting currents of the electric machine which is to be predetermined in correct phase ensures that resonant elevations of the actual signal are counteracted in a damping manner at these frequencies. In principle, it is sufficient if the vibration can be damped by means of this regulating concept below the maximum values predetermined by the reference values of the characteristic line. In particular cases, however, other regulating concepts may also be superimposed. Such regulating concepts are known, for example, from the characteristic field regulation of internal combustion engines.

As mentioned in the above paragraph, the characteristic lines of reference values to be utilized for active vibration damping can be selected depending on further operating parameters of the motor vehicle. The following are examples of suitable operating parameters that may be utilized individually or in groups for the selection of the characteristic line to be used:

a) the torque of the internal combustion engine 1 as detected, for example, by the torque sensor 37;

b) the rate of rotation of the internal combustion engine 1 as detected, for example, by the speed sensor 29;

c) the speed of the motor vehicle as detected, for example, by speed sensor 33 or 35;

d) the temperature of the internal combustion engine 1 as detected, for example, by the temperature sensor 43;

e) the instantaneous transmission ratio of transmission 9 as detected, for example, by the transmission adjustment sensor 39 or as derivable from the actuating signals of the actuating drive 47 of the transmission 9;

f) the weight of the motor vehicle as detected, for example, by the weight sensor 45; and g) whether the internal combustion engine is supplying torque to or receiving torque from the drive wheel 11 as determinable by the mathematical sign of the torque signal of the torque sensor 37.

Each of the above sensors and actuating drives listed above are required, at least in part, for the control of the hybrid drive 100. To this extent, the active vibration damping described above may be effected by software for controlling components that are already present in the motor vehicle. The software may be installed in a vehicle control 62 which likewise acts on the current adjusting device 15.

The vehicle control 62 controls the electric machine 7 exclusively, as was mentioned above, for example, when starting, or in addition to the internal combustion engine 1 for applying an assist torque, in response to a position of the accelerator pedal 25 and on the sensor means 51 described above. The vehicle control 62 also controls the electric machine 7 during generator operation of the electric machine 7, that is, during operating phases in which the internal combustion engine 1 provides the driving torque of the wheels 11 without assistance from the electric machine 7.

For high efficiency of the hybrid drive and a low fuel consumption of the internal combustion engine 1, the electric machine 7, which is operated as a generator in this case, provides for recovery of the movement energy of the motor vehicle by means of electric brakes during braking operation of the motor vehicle. The electric machine 7 charges the vehicle battery 17 via the current adjusting device 15 during this braking operation. However, braking energy is available not only during braking operation of the motor vehicle, but also during the instantaneous deceleration of the internal combustion engine 1 during the active damping operation. The frequency components of the current which can be recovered during active damping operation are so high that they can be stored only with very poor efficiency in a battery storing electric energy through chemical processes. Therefore, the vehicle battery 17 is connected in parallel with a electric storage device 63 that is also suitable for storing high-frequency currents such, for example, as a capacitor battery from which or to which, respectively, the electric machine 7 draws or restores the electric energy required for active damping. While the vehicle control 62 (FIG. 2) supplies the current adjusting device 15 with current from the battery 17, the battery 63 delivers the current determined by the regulator 59.

The regulation means of regulator 59 are not effective for spectral components whose frequency f is less than the limit frequency $f_g$. However, these spectral components, which are indicated in FIG. 3a by a dashed curve, are used for other regulating concepts. In the case of the embodiment example, spectral components of the actual signal below the limit frequency $f_g$ deliver actual-value information for a slip regulation (or slip control) in which the friction clutch 5 is adjusted to a predetermined slight slippage for reducing or eliminating torsional vibrations. A further regulator 65 (FIG. 2) controls the actuating drive 3 of the clutch depending on the actual information and depending on a reference value predetermined at a reference signal preset device 67 which operates similarly to reference signal preset device 57. The reference value from reference signal preset device 67 may also represent a predetermined spectral maximum value in this respect. However, other slip regulating concepts may also determined, for example, in response to the magnitude of the torque to be transmitted, the vibration amplitude, or other parameters. Usually, a slip corresponding to a small percentage of the input rate of rotation of the clutch is sufficient for adequately damping the torsional vibrations that have spectral components below the limit frequency.

The damping characteristics of the active vibration damping system according to the invention may completely obviate mechanical vibration damping systems.

Of course, the active vibration damping system described above can also be used in other hybrid drive configurations. For example, another controllable clutch may be arranged between the electric machine 7 and the transmission 9, or the electric machine 7 may also be coupled directly with the crankshaft of the internal combustion engine without additional coupling.

The invention is not limited by the embodiments described above which are presented as examples only but can be modified in various ways within the scope of protection defined by the appended patent claims.

I claim:

1. A hybrid drive for rotating a drive wheel of a motor vehicle, comprising:
   an internal combustion engine having an output shaft;
   a clutch having an input element connected to said output shaft and an output element;
   a transmission drivably connected to the drive wheel of the motor vehicle;
   a drive shaft connecting said output element of said clutch to said transmission;
   an electric machine connected to the drive shaft, said electric machine operable as a generator for receiving a torque force from said drive shaft and outputting an electric current and as a motor for receiving an electric current and transmitting a torque force to said drive shaft;
   a sensor generating a vibration signal representing vibration information about vibrations in a rotating structural component of said hybrid drive, wherein said rotating structural component comprises one of said internal combustion engine, said output shaft, said clutch, said drive shaft, said transmission, and said drive wheel;
   an analyzing device connected to said sensor and determining an actual frequency spectrum of said vibration signal;
   a reference signal preset device generating a reference signal comprising a predetermined frequency spectrum; and
   a regulator connected to said reference signal preset device and said analyzing device for comparing said actual frequency spectrum to said reference signal, said regulator controlling said electric machine to reduce said vibrations at frequencies at which said vibrations exceed said predetermined frequency spectrum, wherein said regulator further comprises a frequency limiter which limits said actual frequency spectrum to frequencies greater than a predetermined frequency threshold.

2. The hybrid drive of claim 1, wherein said predetermined frequency threshold is greater than a frequency in said actual frequency spectrum that represents a change in the rate of rotation of the rotating structural component at maximum drive acceleration of the motor vehicle.

3. The hybrid drive of claim 1, wherein said reference signal preset device comprises a characteristic line storage device in which reference values of at least one characteristic line are stored as a function of an operating parameter of the motor vehicle.

4. The hybrid drive of claim 1, wherein said electric machine comprises a large number of poles and associated pole windings and said regulator controls a current adjusting device for each said pole windings of said electric machine.

5. The hybrid drive of claim 1, wherein said sensor comprises at least one of a speed sensor detecting the instantaneous angular velocity of said rotating structural component of said hybrid drive, a torque sensor detecting the torque transmitted by said structural component, and a noise sensor detecting noise in the interior of the motor vehicle.

6. The hybrid drive of claim 1, further comprising a battery connected to said electric machine for delivering vehicle current for rotating said drive wheel and an electric drive energy storage device comprising a capacitor storage connected to said electric machine for delivering higher-frequency electric current to the electric machine during operation of the regulator for reducing said actual vibration signal.

7. The hybrid drive of claim 1, further comprising an actuating drive for adjusting said clutch to a slip which reduces or eliminates these spectral components of the vibrations in response to components of the actual vibration signal with frequencies below the predetermined frequency threshold.

8. The hybrid drive of claim 3, wherein said at least one characteristic line is empirically determined.

9. The hybrid drive of claim 3, wherein said reference values form spectral maximum values for spectral values of the actual vibration signal below which said vibrations are to be reduced by said regulator.

10. The hybrid drive of claim 3, wherein said at least one characteristic line comprises a plurality of characteristic lines, wherein each said plural characteristic lines is a function of an operating parameter selected from a group of parameters comprising a torque of said internal combustion engine, a rate of rotation of said internal combustion engine, a driving speed of the motor vehicle, a temperature of said internal combustion engine, an instantaneous transmission ratio of said transmission, a weight of the motor vehicle, and whether torque is applied to or from said electric machine; and said regulator selects a selected one of said plural characteristic lines in response to at least one of said group of operating parameters.

11. The hybrid drive of claim 5, wherein said sensor comprises a plurality of sensors responding to a plurality of vibration parameters and vibrations of different structural component parts.

12. The hybrid drive of claim 6, wherein said electric drive energy storage device receives said electric current output from said electric machine when said electric machine operates as a generator during vibration damping.

13. The hybrid drive of claim 10, wherein each said plural characteristic lines is empirically determined.

* * * * *